US011281723B2

(12) United States Patent
Torres et al.

(10) Patent No.: US 11,281,723 B2
(45) Date of Patent: Mar. 22, 2022

(54) WIDGET RECOMMENDATION FOR AN ONLINE EVENT USING CO-OCCURRENCE MATRIX

(71) Applicant: ON24, Inc., San Francisco, CA (US)

(72) Inventors: Erika Torres, San Francisco, CA (US); Jayesh Sahasi, San Francisco, CA (US)

(73) Assignee: ON24, INC., San Francisco, CA (US)

( * ) Notice: Subject to any disclaimer, the term of this patent is extended or adjusted under 35 U.S.C. 154(b) by 0 days.

(21) Appl. No.: 15/726,057

(22) Filed: Oct. 5, 2017

(65) Prior Publication Data
US 2019/0108234 A1    Apr. 11, 2019

(51) Int. Cl.
| | | |
|---|---|---|
| *G06F 16/9032* | (2019.01) | |
| *G06F 16/958* | (2019.01) | |
| *G06F 3/0484* | (2013.01) | |
| *G06F 16/28* | (2019.01) | |
| *G06F 16/9038* | (2019.01) | |
| *G06F 16/9535* | (2019.01) | |
| *G06Q 10/10* | (2012.01) | |

(52) U.S. Cl.
CPC ...... *G06F 16/90324* (2019.01); *G06F 16/285* (2019.01); *G06F 16/9038* (2019.01); *G06F 16/958* (2019.01); *G06F 16/9535* (2019.01); *G06F 3/0484* (2013.01); *G06Q 10/10* (2013.01)

(58) Field of Classification Search
CPC .. G06F 3/0484; G06F 3/0482; G06F 16/3322; G06F 16/90324; G06F 16/9535; G06F 16/958; G06F 16/285; G06F 16/9038; G06Q 10/10; G06Q 30/0282
See application file for complete search history.

(56) References Cited

U.S. PATENT DOCUMENTS

| | | |
|---|---|---|
| 5,220,665 A | 6/1993 | Coyle, Jr |
| 5,388,197 A | 2/1995 | Rayner |
| 5,420,801 A | 5/1995 | Dockter et al. |
| 5,557,796 A | 9/1996 | Fehskens et al. |
| 5,642,171 A | 6/1997 | Baumgartner et al. |

(Continued)

FOREIGN PATENT DOCUMENTS

| | | |
|---|---|---|
| CN | 1500353 A | 5/2004 |
| CN | 103535026 A | 1/2014 |

(Continued)

OTHER PUBLICATIONS

Abla, G. et al, "Advanced Tools for enhancing control room collaborations"—Fusion Engineering and Design, vol. 81, Issues 15-17, 5th IAEA TM on Control, Data Acquisition, and Remote Participation for Fusion Research—5th IAEA TM, Jul. 2006, pp. 2039-2044, ISSN 0920-3796, DOI: 10.1016/j.jusengdes.200.

(Continued)

*Primary Examiner* — Kieu D Vu
*Assistant Examiner* — Rami R Okasha
(74) *Attorney, Agent, or Firm* — Manatt, Phelps & Phillips LLP (57) ABSTRACT

A widget recommendation system and method recommends user interface widgets for an event that contains content or a presentation. In one embodiment, the system recommends user interface widgets for a landing page for the content or presentation of an event. The system and method may extract features from past events and recommend the user interface widgets.

25 Claims, 6 Drawing Sheets

(56) References Cited

U.S. PATENT DOCUMENTS

| | | |
|---|---|---|
| 5,680,619 A | 10/1997 | Gudmundson et al. |
| 5,732,216 A | 3/1998 | Logan et al. |
| 5,748,185 A | 5/1998 | Stephan et al. |
| 5,752,244 A | 5/1998 | Rose et al. |
| 5,801,685 A | 9/1998 | Miller et al. |
| 5,815,154 A | 9/1998 | Hirschtick et al. |
| 5,838,973 A | 11/1998 | Carpenter-Smith et al. |
| 5,861,906 A | 1/1999 | Dunn |
| 5,892,915 A | 4/1999 | Duso et al. |
| 5,929,850 A | 7/1999 | Broadwin |
| 5,996,015 A | 11/1999 | Day |
| 6,006,332 A | 12/1999 | Rabne et al. |
| 6,008,807 A | 12/1999 | Bretschneider et al. |
| 6,009,458 A | 12/1999 | Hawkins et al. |
| 6,014,706 A | 1/2000 | Cannon |
| 6,058,424 A | 5/2000 | Dixon |
| 6,097,441 A | 8/2000 | Allport |
| 6,108,645 A | 8/2000 | Eichstaedt et al. |
| 6,141,595 A | 10/2000 | Gloudeman et al. |
| 6,155,840 A | 12/2000 | Sallette |
| 6,157,809 A | 12/2000 | Kaqmbayashi |
| 6,223,292 B1 | 4/2001 | Dean et al. |
| 6,253,368 B1 | 6/2001 | Nelin et al. |
| 6,324,683 B1 | 11/2001 | Fuh et al. |
| 6,366,916 B1 | 4/2002 | Baer et al. |
| 6,396,500 B1 | 5/2002 | Qureshi et al. |
| 6,404,978 B1 | 6/2002 | Abe |
| 6,445,834 B1 * | 9/2002 | Rising, III ........ G06F 17/30256 382/190 |
| 6,452,609 B1 | 9/2002 | Katinsky et al. |
| 6,473,749 B1 | 10/2002 | Smith et al. |
| 6,523,022 B1 | 2/2003 | Hobbs |
| 6,535,909 B1 | 3/2003 | Rust |
| 6,538,665 B2 | 3/2003 | Crow et al. |
| 6,546,405 B2 | 4/2003 | Gupta et al. |
| 6,601,026 B2 | 7/2003 | Appelt et al. |
| 6,628,279 B1 | 9/2003 | Schell et al. |
| 6,629,065 B1 | 9/2003 | Gadh et al. |
| 6,636,237 B1 | 10/2003 | Murray et al. |
| 6,636,888 B1 | 10/2003 | Bookspan et al. |
| 6,657,543 B1 | 12/2003 | Chung |
| 6,697,805 B1 | 2/2004 | Choquier et al. |
| 6,714,909 B1 | 3/2004 | Gibbon et al. |
| 6,715,126 B1 | 3/2004 | Chang et al. |
| 6,728,753 B1 | 4/2004 | Parasnis et al. |
| 6,745,344 B1 | 6/2004 | Joshi et al. |
| 6,748,382 B1 | 6/2004 | Mohan et al. |
| 6,795,972 B2 | 9/2004 | Rovira |
| 6,801,224 B1 | 10/2004 | Chang et al. |
| 6,834,308 B1 | 12/2004 | Ikezoye et al. |
| 6,842,175 B1 | 1/2005 | Schmalstieg et al. |
| 6,850,944 B1 | 2/2005 | MacCall et al. |
| 6,859,838 B1 | 2/2005 | Puranik et al. |
| 6,877,023 B1 | 4/2005 | Maffeis et al. |
| 6,920,181 B1 | 7/2005 | Porter |
| 7,062,722 B1 | 6/2006 | Carlin et al. |
| 7,079,990 B2 | 7/2006 | Haller et al. |
| 7,096,416 B1 | 8/2006 | Smith et al. |
| 7,103,770 B2 | 9/2006 | Conrath |
| 7,146,329 B2 | 12/2006 | Conkwright et al. |
| 7,168,035 B1 | 1/2007 | Bell et al. |
| 7,188,186 B1 | 3/2007 | Meyer et al. |
| 7,281,034 B1 | 10/2007 | Eyal |
| 7,281,060 B2 | 10/2007 | Hofmann et al. |
| 7,290,057 B2 | 10/2007 | Suanders et al. |
| 7,296,137 B2 | 11/2007 | Moyer |
| 7,313,595 B2 | 12/2007 | Rust |
| 7,330,875 B1 | 2/2008 | Parasnis et al. |
| 7,349,944 B2 | 3/2008 | Vernon |
| 7,350,231 B2 | 3/2008 | Madison et al. |
| 7,363,372 B2 | 4/2008 | Potenzone et al. |
| 7,370,269 B1 | 5/2008 | Prabhu et al. |
| 7,415,529 B2 | 8/2008 | Saunders et al. |
| 7,418,431 B1 | 8/2008 | Nies et al. |
| 7,441,201 B1 | 10/2008 | Printezis |
| 7,454,708 B2 | 11/2008 | O'Neal et al. |
| 7,559,055 B2 | 7/2009 | Yang et al. |
| 7,561,178 B2 | 7/2009 | Baartman et al. |
| 7,590,945 B2 | 9/2009 | Sims et al. |
| 7,711,722 B1 | 5/2010 | Sahasi et al. |
| 7,712,052 B2 | 5/2010 | Szeliski et al. |
| 7,873,638 B2 | 1/2011 | Young et al. |
| 8,234,336 B2 | 7/2012 | Slater et al. |
| 8,392,821 B2 | 3/2013 | DeMarco et al. |
| 8,443,041 B1 | 5/2013 | Krantz et al. |
| 8,682,672 B1 | 3/2014 | Ha et al. |
| 8,682,969 B1 | 3/2014 | Sahasi et al. |
| 8,706,812 B2 | 4/2014 | Sahasi et al. |
| 8,798,252 B2 | 8/2014 | Krantz et al. |
| 9,046,995 B2 | 6/2015 | Garland |
| 9,135,312 B2 | 9/2015 | Greenspan et al. |
| 9,148,480 B2 | 9/2015 | Sahasi et al. |
| 9,224,173 B2 | 12/2015 | Arora et al. |
| 9,553,922 B1 * | 1/2017 | Guarraci ................. H04W 4/21 |
| 9,720,577 B1 | 8/2017 | Sahasi |
| 9,721,035 B2 * | 8/2017 | Fink ................. G06F 17/30905 |
| 9,892,028 B1 | 2/2018 | Garland |
| 9,973,576 B2 | 5/2018 | Sahasi et al. |
| 10,430,491 B1 | 10/2019 | Joshi et al. |
| 10,785,325 B1 | 9/2020 | Baishya et al. |
| 2001/0027420 A1 | 10/2001 | Boublik et al. |
| 2001/0032242 A1 | 10/2001 | Terahama et al. |
| 2001/0032305 A1 | 10/2001 | Barry |
| 2002/0016788 A1 | 2/2002 | Burridge |
| 2002/0026323 A1 | 2/2002 | Sakaguchi et al. |
| 2002/0065635 A1 | 5/2002 | Lei et al. |
| 2002/0078150 A1 | 6/2002 | Thompson et al. |
| 2002/0085029 A1 | 7/2002 | Ghani |
| 2002/0087496 A1 | 7/2002 | Stirpe et al. |
| 2002/0107673 A1 | 8/2002 | Haller et al. |
| 2002/0112031 A1 | 8/2002 | Franklin et al. |
| 2002/0112155 A1 | 8/2002 | Martherus et al. |
| 2002/0112247 A1 | 8/2002 | Horner et al. |
| 2002/0122050 A1 | 9/2002 | Sandberg |
| 2002/0133719 A1 | 9/2002 | Westerdal |
| 2002/0143901 A1 | 10/2002 | Lupo et al. |
| 2002/0152278 A1 | 10/2002 | Pontenzone et al. |
| 2002/0193895 A1 | 12/2002 | Qian et al. |
| 2003/0004791 A1 | 1/2003 | Kojima |
| 2003/0005019 A1 | 1/2003 | Pabla et al. |
| 2003/0005465 A1 | 1/2003 | Connely |
| 2003/0014521 A1 | 1/2003 | Elson et al. |
| 2003/0025650 A1 | 2/2003 | Uesaki et al. |
| 2003/0037131 A1 | 2/2003 | Verma |
| 2003/0061280 A1 | 3/2003 | Bulson et al. |
| 2003/0061330 A1 | 3/2003 | Frisco et al. |
| 2003/0071810 A1 | 4/2003 | Shoov et al. |
| 2003/0086682 A1 | 5/2003 | Schofield et al. |
| 2003/0101091 A1 | 5/2003 | Levin et al. |
| 2003/0115267 A1 | 6/2003 | Hinton et al. |
| 2003/0154277 A1 | 8/2003 | Haddad et al. |
| 2003/0156135 A1 | 8/2003 | Lucarelli |
| 2003/0167315 A1 | 9/2003 | Chowdhry |
| 2003/0204566 A1 | 10/2003 | Dhupelia et al. |
| 2004/0024898 A1 | 2/2004 | Wan |
| 2004/0030787 A1 | 2/2004 | Jandel et al. |
| 2004/0032424 A1 | 2/2004 | Florschuetz |
| 2004/0039834 A1 | 2/2004 | Saunders et al. |
| 2004/0049539 A1 | 3/2004 | Reynolds et al. |
| 2004/0054542 A1 | 3/2004 | Foote et al. |
| 2004/0059941 A1 | 3/2004 | Hardman et al. |
| 2004/0073629 A1 | 4/2004 | Bazot et al. |
| 2004/0098754 A1 | 5/2004 | Vella et al. |
| 2004/0103150 A1 | 5/2004 | Ogdon et al. |
| 2004/0125877 A1 | 7/2004 | Chang et al. |
| 2004/0143603 A1 | 7/2004 | Kaufmann et al. |
| 2004/0148375 A1 | 7/2004 | Levett et al. |
| 2004/0153504 A1 | 8/2004 | Hutchinson et al. |
| 2004/0162787 A1 | 8/2004 | Madison et al. |
| 2004/0167896 A1 | 8/2004 | Eakin |
| 2004/0187140 A1 | 9/2004 | Aigner et al. |
| 2004/0237120 A1 | 11/2004 | Lewin et al. |
| 2004/0243928 A1 | 12/2004 | Hesmer et al. |
| 2004/0268224 A1 | 12/2004 | Balkus et al. |

(56) References Cited

U.S. PATENT DOCUMENTS

| | | |
|---|---|---|
| 2005/0039131 A1 | 2/2005 | Paul |
| 2005/0093860 A1 | 5/2005 | Yanagisawa et al. |
| 2005/0138560 A1 | 6/2005 | Lee et al. |
| 2005/0144258 A1 | 6/2005 | Burckart et al. |
| 2005/0183143 A1 | 8/2005 | Anderholm et al. |
| 2005/0204148 A1 | 9/2005 | Mayo et al. |
| 2005/0212797 A1 | 9/2005 | Lee et al. |
| 2005/0223340 A1 | 10/2005 | Repka |
| 2005/0223341 A1 | 10/2005 | Repka |
| 2005/0223342 A1 | 10/2005 | Repka et al. |
| 2005/0278650 A1 | 12/2005 | Sims et al. |
| 2005/0288001 A1 | 12/2005 | Foster et al. |
| 2006/0005114 A1 | 1/2006 | Williamson et al. |
| 2006/0031914 A1 | 2/2006 | Dakss et al. |
| 2006/0048058 A1 | 3/2006 | O'Neal et al. |
| 2006/0106780 A1 | 5/2006 | Degan |
| 2006/0129933 A1 | 6/2006 | Land et al. |
| 2006/0150149 A1 | 7/2006 | Chandhoke et al. |
| 2006/0167896 A1 | 7/2006 | Kapur et al. |
| 2006/0235973 A1 | 10/2006 | McBride et al. |
| 2006/0265495 A1 | 11/2006 | Butler et al. |
| 2006/0277553 A1 | 12/2006 | Henning et al. |
| 2007/0038931 A1 | 2/2007 | Allaire et al. |
| 2007/0055401 A1 | 3/2007 | Van Bael et al. |
| 2007/0121850 A1 | 5/2007 | Klos et al. |
| 2007/0174905 A1 | 7/2007 | Martherus et al. |
| 2007/0192613 A1 | 8/2007 | Amoroso et al. |
| 2007/0192727 A1 | 8/2007 | Finley et al. |
| 2007/0211065 A1 | 9/2007 | Feth et al. |
| 2007/0245243 A1 | 10/2007 | Lanza et al. |
| 2007/0271367 A1 | 11/2007 | Yardeni et al. |
| 2007/0282858 A1 | 12/2007 | Arner et al. |
| 2008/0005240 A1 | 1/2008 | Knighton et al. |
| 2008/0005247 A9 | 1/2008 | Khoo |
| 2008/0028341 A1 | 1/2008 | Szeliski et al. |
| 2008/0062969 A1 | 3/2008 | Picard et al. |
| 2008/0062970 A1 | 3/2008 | Picard et al. |
| 2008/0086456 A1 | 4/2008 | Rasanen et al. |
| 2008/0109396 A1 | 5/2008 | Kacin |
| 2008/0120336 A1 | 5/2008 | Bergman et al. |
| 2008/0189162 A1 | 8/2008 | Ganong et al. |
| 2008/0201736 A1 | 8/2008 | Gordon et al. |
| 2008/0235189 A1 | 9/2008 | Rayman et al. |
| 2008/0270151 A1 | 10/2008 | Mahoney et al. |
| 2008/0276271 A1 | 11/2008 | Anderson et al. |
| 2009/0013244 A1 | 1/2009 | Cudich |
| 2009/0019367 A1 | 1/2009 | Cavagnari et al. |
| 2009/0044138 A1* | 2/2009 | Rudolph .............. G06F 17/3089 715/765 |
| 2009/0049385 A1 | 2/2009 | Blinnikka et al. |
| 2009/0066366 A1 | 3/2009 | Solomon |
| 2009/0083641 A1 | 3/2009 | Christy |
| 2009/0094520 A1 | 4/2009 | Kulas |
| 2009/0094544 A1 | 4/2009 | Savage |
| 2009/0100372 A1 | 4/2009 | Lauridsen |
| 2009/0133048 A1 | 5/2009 | Gibbs et al. |
| 2009/0138508 A1 | 5/2009 | Tolle |
| 2009/0171968 A1* | 7/2009 | Kane ................. G06F 17/30867 |
| 2009/0172021 A1* | 7/2009 | Kane ................. G06F 17/30873 |
| 2009/0172597 A1 | 7/2009 | Mercer |
| 2009/0187825 A1 | 7/2009 | Sandquist et al. |
| 2009/0217187 A1 | 8/2009 | Kendall et al. |
| 2009/0222842 A1 | 9/2009 | Narayanan et al. |
| 2009/0259937 A1 | 10/2009 | Rohall et al. |
| 2009/0287790 A1 | 11/2009 | Upton et al. |
| 2009/0292584 A1* | 11/2009 | Dalal ..................... G06Q 30/02 705/7.29 |
| 2009/0292768 A1 | 11/2009 | Franke |
| 2010/0023849 A1 | 1/2010 | Hakim et al. |
| 2010/0037205 A1 | 2/2010 | Maillot et al. |
| 2010/0057415 A1 | 3/2010 | Chu et al. |
| 2010/0189131 A1 | 7/2010 | Branam et al. |
| 2010/0192132 A1 | 7/2010 | Yuan |
| 2010/0216443 A1 | 8/2010 | Jacobstein et al. |
| 2010/0251174 A1* | 9/2010 | Belandrino ............. G06F 9/451 715/810 |
| 2010/0277696 A1 | 11/2010 | Huebner |
| 2010/0325674 A1 | 12/2010 | Liu |
| 2011/0010307 A1* | 1/2011 | Bates ..................... G06Q 30/02 705/347 |
| 2011/0026898 A1 | 2/2011 | Lussier et al. |
| 2011/0035431 A1 | 2/2011 | Geary et al. |
| 2011/0055176 A1 | 3/2011 | Choi et al. |
| 2011/0082719 A1 | 4/2011 | Dutta |
| 2011/0191316 A1* | 8/2011 | Lai ............................ G06F 7/10 707/706 |
| 2011/0225015 A1* | 9/2011 | Spivack ........... G06Q 10/06314 705/7.24 |
| 2011/0252094 A1 | 10/2011 | Sahasi et al. |
| 2011/0276372 A1* | 11/2011 | Spivack ................ G06Q 10/109 705/14.5 |
| 2011/0289422 A1* | 11/2011 | Spivack ................ G06Q 10/109 715/739 |
| 2012/0048298 A1 | 3/2012 | Humphrey et al. |
| 2012/0084292 A1* | 4/2012 | Liang .................. G06F 16/2228 707/741 |
| 2012/0109966 A1* | 5/2012 | Liang .................. G06F 16/3323 707/740 |
| 2012/0130771 A1 | 5/2012 | Kannan et al. |
| 2012/0158902 A1 | 6/2012 | Udtke et al. |
| 2012/0191716 A1 | 7/2012 | Omoigui |
| 2012/0210247 A1 | 8/2012 | Khouri et al. |
| 2012/0226984 A1 | 9/2012 | Bastide et al. |
| 2012/0246137 A1 | 9/2012 | Sallakonda et al. |
| 2012/0254454 A1 | 10/2012 | Margush et al. |
| 2012/0290399 A1* | 11/2012 | England ................. G06Q 50/01 705/14.66 |
| 2012/0290950 A1 | 11/2012 | Rapaport et al. |
| 2012/0310750 A1* | 12/2012 | Schutzbank ........... G06Q 30/02 705/14.72 |
| 2013/0036191 A1* | 2/2013 | Fink .................. G06F 17/30905 709/217 |
| 2013/0132374 A1 | 5/2013 | Olstad et al. |
| 2013/0138585 A1* | 5/2013 | Forte ...................... G06Q 30/02 706/12 |
| 2013/0215116 A1 | 8/2013 | Siddique et al. |
| 2013/0268872 A1 | 10/2013 | Yin et al. |
| 2013/0282611 A1 | 10/2013 | Avedissian et al. |
| 2014/0068779 A1 | 3/2014 | Tan et al. |
| 2014/0115466 A1* | 4/2014 | Barak .................... G06F 9/451 715/716 |
| 2014/0123014 A1 | 5/2014 | Keen |
| 2014/0126714 A1 | 5/2014 | Sayko et al. |
| 2014/0126715 A1 | 5/2014 | Lum et al. |
| 2014/0136528 A1* | 5/2014 | Anima .............. G06F 17/30864 707/723 |
| 2014/0214691 A1 | 7/2014 | Morris, III |
| 2014/0229839 A1 | 8/2014 | Lynch et al. |
| 2014/0237381 A1 | 8/2014 | Socolof |
| 2014/0258372 A1* | 9/2014 | Lerman ................... H04L 67/42 709/203 |
| 2014/0279049 A1 | 9/2014 | Wiseman |
| 2014/0289326 A1 | 9/2014 | McCormack et al. |
| 2014/0317031 A1* | 10/2014 | Babenko ........... G06F 17/30017 706/12 |
| 2014/0366098 A1 | 11/2014 | Savage et al. |
| 2014/0372468 A1* | 12/2014 | Collins ............... G06F 16/9535 707/769 |
| 2015/0002619 A1 | 1/2015 | Johnston et al. |
| 2015/0006610 A1 | 1/2015 | Johnston et al. |
| 2015/0082021 A1 | 3/2015 | Mandyann et al. |
| 2015/0106801 A1* | 4/2015 | Agrawal ...................... G06F 8/60 717/177 |
| 2015/0113451 A1* | 4/2015 | Kopp .................... G06Q 10/00 715/764 |
| 2015/0127418 A1* | 5/2015 | Piepgrass ........... G06Q 30/0201 705/7.29 |
| 2015/0189377 A1* | 7/2015 | Wheatley ......... H04N 21/44218 725/12 |
| 2015/0199114 A1* | 7/2015 | Louch .................. G06F 3/04817 715/765 |

(56) References Cited

U.S. PATENT DOCUMENTS

| | | | |
|---|---|---|---|
| 2015/0213145 A1 | 7/2015 | Baldwin | |
| 2015/0213361 A1 | 7/2015 | Gamon et al. | |
| 2015/0278363 A1 | 10/2015 | Briere et al. | |
| 2015/0304367 A1 | 10/2015 | Chan et al. | |
| 2015/0347437 A1* | 12/2015 | Marti | G06F 17/3097 707/731 |
| 2015/0365244 A1 | 12/2015 | Schmiltz et al. | |
| 2016/0011729 A1* | 1/2016 | Flores | G06F 3/167 715/728 |
| 2016/0028790 A1 | 1/2016 | Eriksson et al. | |
| 2016/0035230 A1* | 2/2016 | Spaulding | G09B 5/02 434/236 |
| 2016/0180248 A1 | 6/2016 | Regan | |
| 2017/0046374 A1 | 2/2017 | Fletcher et al. | |
| 2017/0064358 A1 | 3/2017 | Sullivan et al. | |
| 2017/0097743 A1* | 4/2017 | Hameed | G06F 9/445 |
| 2017/0140398 A1 | 5/2017 | Fleischman et al. | |
| 2017/0243255 A1 | 8/2017 | Sahasi et al. | |
| 2017/0255696 A1 | 9/2017 | Pulitzer | |
| 2017/0366848 A1* | 12/2017 | Shaw | H04N 21/4621 |
| 2018/0033051 A1* | 2/2018 | Maynard | G06F 17/30876 |
| 2018/0211285 A1* | 7/2018 | Todasco | G06Q 30/0269 |
| 2018/0262561 A1 | 9/2018 | Sahasi et al. | |
| 2018/0293610 A1* | 10/2018 | Maynard | G06F 8/34 |
| 2019/0108438 A1 | 4/2019 | Torres et al. | |
| 2020/0382583 A1 | 12/2020 | Sahasi et al. | |

FOREIGN PATENT DOCUMENTS

| | | |
|---|---|---|
| EP | 2261898 A1 | 12/2010 |
| KR | 20100003117 A | 1/2010 |
| WO | WO 02082815 | 10/2002 |
| WO | WO 02093352 | 11/2002 |
| WO | WO 02097616 | 12/2002 |
| WO | WO2009020770 A1 | 2/2009 |

OTHER PUBLICATIONS

Guthery, S., Kehr, R., and Posegga, J. 2001, How to turn a GSM SIM into a web server, In Proceedings of the Fourth Working Conference on Smart Card Research and Advanced Applications on Smart Card Research and Advanced Applications (Bristol, United Kingdom). J. Domingo-Ferrer, D. Chan, and A. Watson, Norwell, MA.
Holmberg, et al., "Web Real-Time Communication Use Cases and Requirements"; dated Mar. 2015 (29 pgs.).
Draft—C. Holmberg, et al., "Web Real-Time Communication Use Cases and Requirements"; dated Oct. 14, 2013 (25 pgs.).
Saint-Andre, P. 2005. Streaming XML with Jabber/XMPP. IEEE Internet Computing 9, 5 (Sep. 2005).
Sen, Sandip, An Automated Distributed Meeting Scheduler,PSU, Apr. 2007; http://citeseerx.ist.psu.edu/viewdoc/summary?doi=10.1.1.56.6862 (13 pgs.).
Sinha, et al., Video Conferencing System, Columbia University, http://www.cs.columbia.edu/~sedwards/classes/2009/4840/reports/RVD-presentation.pdf (11 pgs.).
Best practices in Webcasting for Publishing; Author: ON24, Publication: 2006.
NPL#1, UoW-EauClaire Microsoft PowerPoint 2003, Sep. 2004, http://web.archive.org/web/20040919191008/http://www.uwec.edu/help/ppoint03.htm, archived: Sep. 19, 2004, printed: Jan. 10, 2008
NPL#1a, UoW-EauClaire Microsoft PowerPoint 2003, Dec. 2004, http://web.archive.org/web/20041221201404/www.uwec.edu/help/PPoint03/webenvir.htm, archived: Dec. 21, 2004, printed: Jan. 10, 2008.
3D Object Modeling and Recognition Using Local Affine-Invariant Image Descriptors and Multi-View Spatial Constraints—Fred Rothganger and Svetlana Lazebnik; Jean Ponce—Department of Computer Science and Beckman Institute, University of Illinois—Cordelia Schmid Inria, France—International Journal of Computer Vision 66(3), 231-259, 2006.
Efficient 3D shape matching and retrieval using a concrete radialized spherical projection representation—Panagiotis Papadakis, Ioannis Pratikakis, Stavros Perantonis, Theoharis Theoharis—Greece—Pattern Recognition 40 (2007)—ScienceDirect.
Microsoft Corporation—"COM: Component Object Model Technologies"—archived dated Oct. 23, 2004, 2 pages. located @ http://web.archive.org/web/20041023025124/http://www.microsoft.com/com/default.mspx.
"Breeze Manager User Guide," Copyright © 2005 Macromedia, Inc., Second Edition: Jun. 2005, 306 pages.
"Breeze Meeting User Guide for Meeting Hosts and Presenters", Copyright © 2005 Macromedia, Inc., Third Edition: Sep. 2005, 130 pages.
Freeman et al.; "Creative Collaboration between Audiences and Musicians in Flock," Georgia Tech Center for Music Technology, Feb. 2010, 17 pages. http://distributedmusic.gatech.edu/jason/publications/pdf_files_of_publications/flock-digitalcreativity.pdf.
Suduc et al., "Exploring Multimedia Web Conferencing," Valahia University of Targoviste, Exploring Multimedia Web Conferencing (Year: 2009), Mar. 2009, 14 pages. https://www.researchgate.net/profile/Suduc_Ana-Maria/publication/26849386.
Sam Dutton, "Get Started with WebRTC", published Jul. 23, 2012 (updated: Nov. 24, 2020), 24 pages. https://www.html5rocks.com/en/tutorials/webrtc/basics/.
Marni Gunther, "Webcasting 101: Online Broadcasting in the Meetings and Events Industry", Netbriefings, Inc., Jul. 2008, 2 pages. http://www.netbriefings.com/pdf/0807-MtgsMNHospitality.pdf.
Aguiar, Everaldo, et al. "Engagement vs performance: using electronic portfolios to predict first semester engineering student retention." Proceedings of the Fourth International Conference on Learning Analytics And Knowledge. 2014: 103-112 (Year: 2014), 10 pages.
Navarathna, Rajitha, et al. "Estimating audience engagement to predict movie ratings." IEEE Transactions on Affective Computing 10.1 (Jul. 3, 2017): 48-59. (Year: 2017), 12 pages.
Ebner, et al.; "First steps towards an integration of a Personal Learning Environment at university level", Jan. 1, 2011, 15 pages.
Berthold et al.; "Psycho-pedagogical Mash-Up Design for Personalizing the Learning Environment", Knowledge Management Institute, Graz University of Technology, Austria, Jul. 11, 2011, 15 pages.

\* cited by examiner

WIDGET RECOMMENDATION FOR AN ONLINE EVENT USING CO-OCCURRENCE MATRIX

FIELD

The disclosure relates generally to a system and method for recommending user interface elements of a web page and more specifically to a system and method for recommending widgets for a webinar or for the landing page of a presentation.

BACKGROUND

When a person creates a new on-line presentation or new content, it is desirable to create a landing page for the content or webinar. Thus, a presenter needs to set up a landing page for the content. However, the presenter does not know which combination of user interface widgets in the landing page or webinar render the best engagement for any particular type of content. The look of a landing page is fundamental for a good presentation. Some audience members will not properly engage with the content if it is irrelevant, static, or uninteresting. The right selection of interactive widgets is critical to a highly engaging online content experience. And a highly engaged viewer is critical to proper dissemination of information, or collecting behavior profiles about a prospect from a marketers' perspective.

There have been a lot of solutions proposed to improve the user's engagement with web content. However, the problem is always treated from the viewer perspective. For example Aimojo uses tags to recommend customized content for the user and find a meaningful distance to recommend the topics near to user's likings. A user can add this plugin to a web page and it will recommend more customized content for the user. An another example, Kindred Posts uses machine learning to analyze how a website's visitors navigate the site and recommends content based on their interest. Those approaches have proven to increase the amount of time spent in a web page.

The problem with the other approaches is that are not suitable for recommending user interface widgets. Specifically, since a presenter has only one chance to catch the audience's attention, it is desirable to improve the chance of high engagement. It is thus desirable to be able to recommend one or more user interface widgets in a landing page which is a technical problem that has not been overcome and it also a problem unique to the web pages and the Internet.

DETAILED DESCRIPTION OF ONE OR MORE EMBODIMENTS

The disclosure is particularly applicable to user interface widget recommendation system and method integrated into a web presentation system for recommending user interface widgets for a landing page for an event and it is in this context that the disclosure will be described. It will be appreciated, however, that the system and method has greater utility since it may be used to recommend user interface widgets for other systems, the widget recommendation system may be a stand-alone system or have a software as a service (SaaS) architecture that provide widget recommendations to third party systems and the widget recommendation system may be used to recommend the widgets for other pages, other applications and the like. Furthermore, the widget recommender may be used for various different types of content including the web presentation in the example below, a webinar, an interactive video or a flipbook. The webinar, presentation, interactive video, flipbook, etc., may be known as an event.

The one or more user interface widgets (with each user interface widget also being referred to simply as a widget) that may be recommended by the system may include, for example, a Player media widget, Player slide widget, Player Q&A widget, Player online help widget, Resource list widget, Speaker bio widget, Survey widget, Player URL target widget, Twitter widget, Contact us widget, Share this widget, Group chat widget, Email widget, Player rich text widget, LinkedIn widget and Facebook widget, among others. The player media widget plays the audio and/or video for a webinar or event. For archived events, this widget allows attendees to pause, fast-forward, or rewind the presentation or event. The player slide widget displays the slides that are presented to the audience during the event. The Slides widget will also display polls, surveys, and video clips that are pushed to the slides section. The player Q&A widget allows attendees to submit questions at any time during live or on-demand events. The resource list widget lets a presenter of an event add documents, presentations, URLs, podcasts, and other content to the event. The speaker bio widget allows a person to introduce the presenter for an event with important information such as their name, photo, title, company, and a brief biography. The survey widget allows a person to survey the audience during an event. The widget allows the person to ask multiple choice, true/false, and open-ended questions, and attendees reply directly from within the event. The player URL target widget allows a person to direct event/webinar attendees to a related URL and the person can either provide a link that, when clicked, will open in a new tab, or the person can have the website load within the widget window. The Twitter widget allows the attendees of the event to view one or more Twitter feeds from within the event, such as an ON24 webinars. The share this widget allows attendees of an event to share the event/webinar's title, description, and URL with their friends and colleagues on 17 popular social media sites. The group chat widget allows audience members, using the Group Chat widget, to directly chat with one another. The widget can be configured to allow anonymous participation or show users' names in the text chat display. The email a Friend widget provides an easy means for viewers/attendees to share information about the event/webinar with their friends and colleagues. The player rich text widget allows text to be added to the webinar console. The LinkedIn widget allows the audience to connect with the company of the presenter of the event via LinkedIn. For example, audience members can follow the company's or the presenters LinkedIn page, see who else in their network is following the company's or the presenters LinkedIn page, and share the company's or the presenters LinkedIn page with the public, their connections, groups, or private individuals. The Facebook widget allows attendees to connect with the company of the presenter of the event by liking and sharing the Facebook page of the company with their connections on Facebook.

Each user interface widget that appears on a web page, such as landing page, is a visual icon that appears on a web page. When the widget is clicked/selected by the user when the user interacts with the one or more widgets, the widget causes an action unique for the particular widget. For example, the page may have a Q&A widget that creates a Q&A interface into which the user can type a question. In one embodiment of the system, each widget may be a plurality of lines of computer code that may be executed by a processor (such as a processor of the attendee's computer) to implement the function for that widget. The page with the event and the one or more user interface widgets may be known as an event page.

In the exemplary embodiment described below, the look of a landing page is fundamental for a good presentation and some audience members will be disappointed if the page shows unimpressive features. Thus, the system recommends the best combination of user interface widgets to increase the chances of good audience engagement. The system will recommend a set of widgets to fulfill this purpose. The systems makes a recommendation based on the engagement reported in content previously posted, evaluating which widgets worked better for every type of content. For example, the system may make recommendations based on the user interface widgets used in other similar landing pages that obtained high engagement in the past. In this disclosure, high engagement refers to having an Engagement Score greater than 5 when the engagement score range is from 0 to 10, where 0 means no engagement at all and 10 is the maximum engagement. The Engagement Score is a single number used to measure attendees' participation, interactivity, and use of webcast/event features. The Engagement Score's algorithm weighs the points based on their impact on viewer interest, the factors may include: Length of time watching the webcast; Number of questions asked; Number of polls answered; Number of complementary resources viewed; Number of widgets opened on the console; and Completion of the webcast survey. The higher the score, the more engaged a viewer was during the webinar/event.

Figure 1:
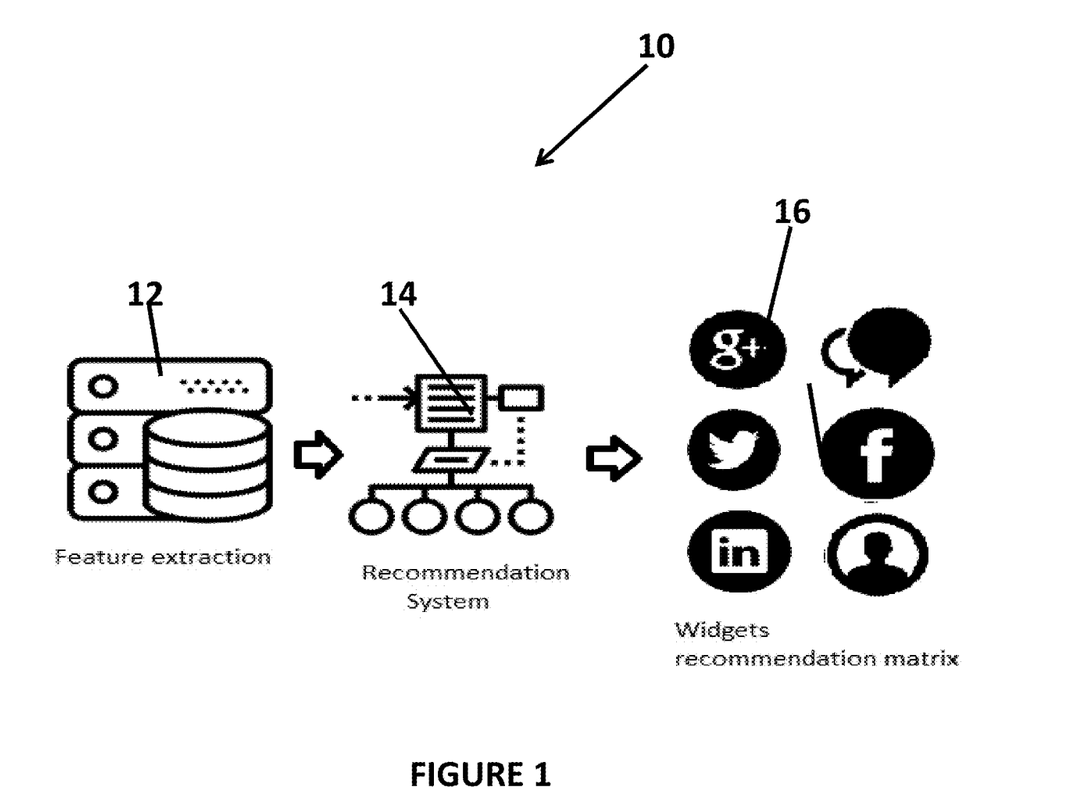
FIG. 1 illustrates a widget recommendation process.

FIG. 1 illustrates a widget recommendation process 10. The method may be carried out by various systems, both hardware or software, such as the system shown in FIG. 3. The method may also be carried out by a specialized system, such as web-based live presentation system or by a stand-alone/software as a service system. The method 10 may include the ordered combination of processes including data and feature extraction 12, recommendation 14 and user interface widget selection 16. More specifically the method may comprises:

0 Data and feature extraction (12): The method extracts the user interface widgets used in all the content published, categories and audience engagement of every widget. The method may build a feature vector where every widget is represented in a column, if the widget was used at least one time we set the value to that number. If it was not used the value is set to zero. The categories are encoded by dictionary to integer values. The engagement median is evaluated over all the users that consumed that content.

1 Summation of meaningful data: The method may sum up the feature vectors (numeral 1) from the contents that belong to a category of interest and the category/content category can have different predetermined values like Marketing, Training/Learning, Communications, Career Fair/Recruiting. This process only takes into account the widgets used in at least 30% of contents of that category.

2 Collaborative-filtering recommender (14) based on a co-occurrence matrix: The method may calculate a co-occurrence matrix based in the features extracted in the data and feature extraction stage, only with the contents that report a very high engagement.

3 Customized the recommendation for the category or type: The method calculates the cross product between the co-occurrence matrix and the vector from the summation of meaningful data stage above which is the scoring vector.

4 The method may sort the vector and choose one or more user interface widgets with bigger scores for the landing page of a particular piece of content.

Figure 2:
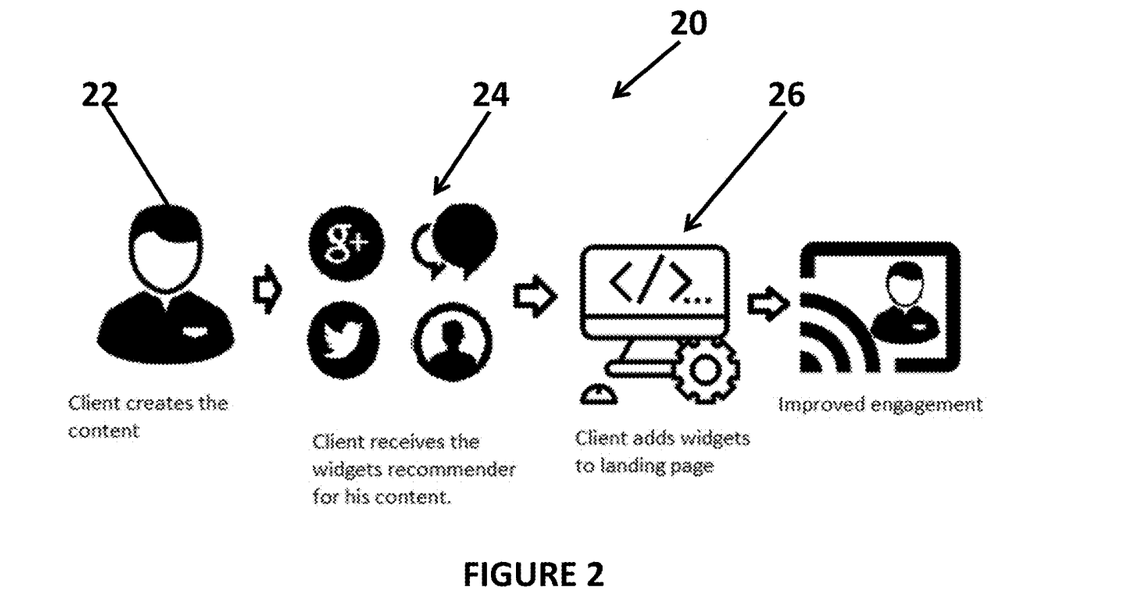
FIG. 2 illustrates a client perspective of a recommendation system scheme.

FIG. 2 illustrates a client perspective of a recommendation system scheme 20. In the method, a client creates a piece of content that belong to one or more certain categories (22) and has one or more characteristics as described below. In the method, an application programming interface (API) of the recommender system may receive this information and provides a set of recommended widgets (24) that will improve the engagement of that type of content once the client adds the widgets to the landing page (26).

Figure 7:
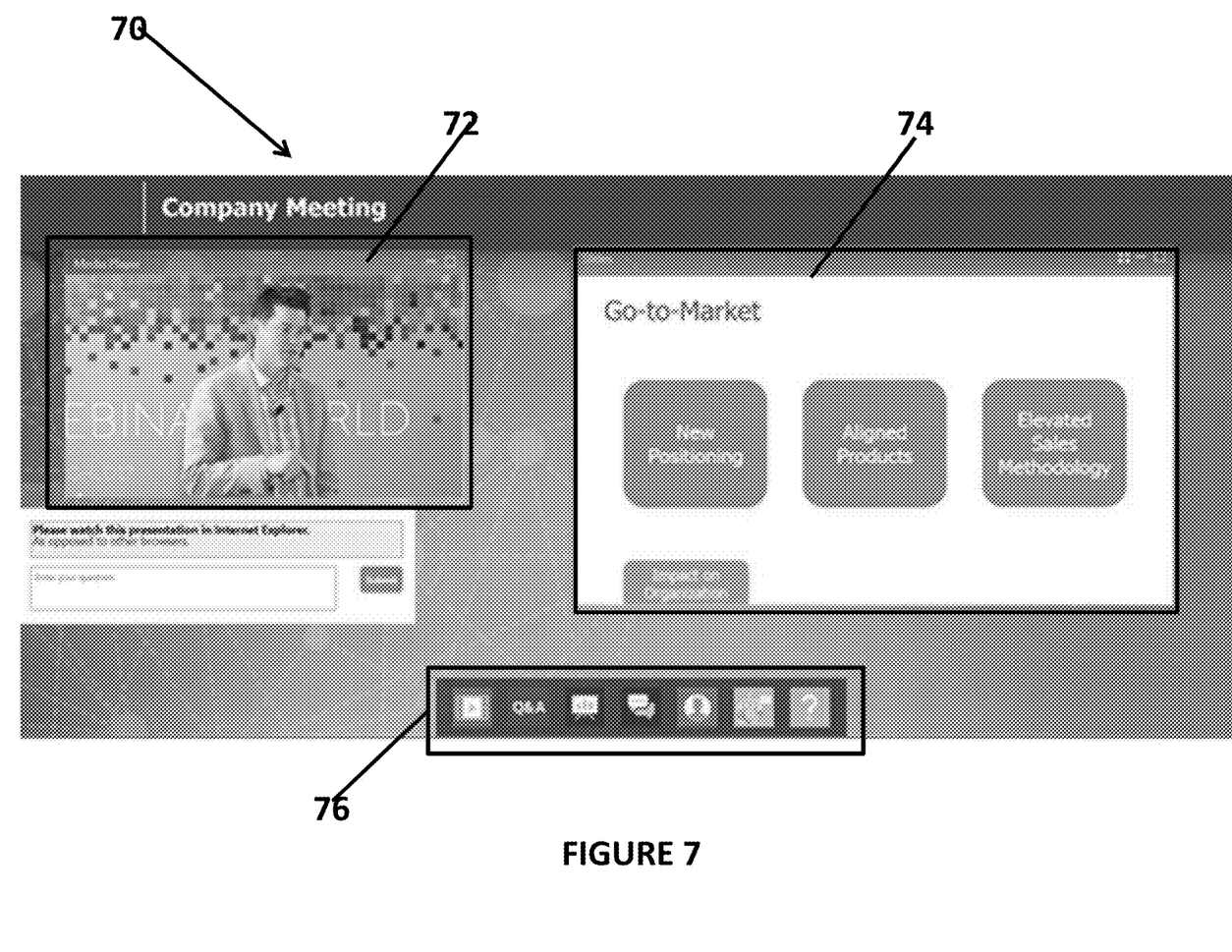
FIG. 7 illustrates an example of a landing page with a presentation and content and one or more recommended widgets.

In the embodiment shown in FIG. 2, the client may add any of the one or more recommended user interface widgets to their landing page (an example of which is shown in FIG. 7 with a landing page and user interface widgets). In alternate implementations, the system may do automated AB testing, adding one or two of the recommended widgets at a time, and tracking engagement. Then, based on the most successful outcomes, based on measures of audience engagement, the configuration will evolve over time. The system may also then automatically select and add the one or more recommended widgets to the event page of the event.

These methods address a technical problem of being able to determine and recommend user interface widgets on an event page for increasing attendee engagement for a presentation. Thus, existing systems that select widgets via human beings cannot achieve the solution of the disclosed system and method or the accuracy of the recommended user interface widgets that improve attendee engagement. Furthermore, the system and method provide a technical solution to the problem using technical features (including the feature extraction, co-occurrence matrix and the recommended widgets) to achieve the recommended one or more user interface widgets that demonstratively improve attendee engagement for a landing page of a piece of content/presentation. The disclosed system and method is also not just generic computers, but are specially configured and programmed systems (computers with instructions that specially configure the computers) that achieve the technical solution. The disclosed system and method also has the co-occurrence matrix for widgets and the recommended widgets that are like a set of rules to perform facial animation, that are executed by a computer system that provide that technical solution. Furthermore, the user interface widgets, the event page, the co-occurrence matrix and engagement using user interface widgets require computers and the Internet and were a problem that did not exist before computers and the Internet.

Figure 3:
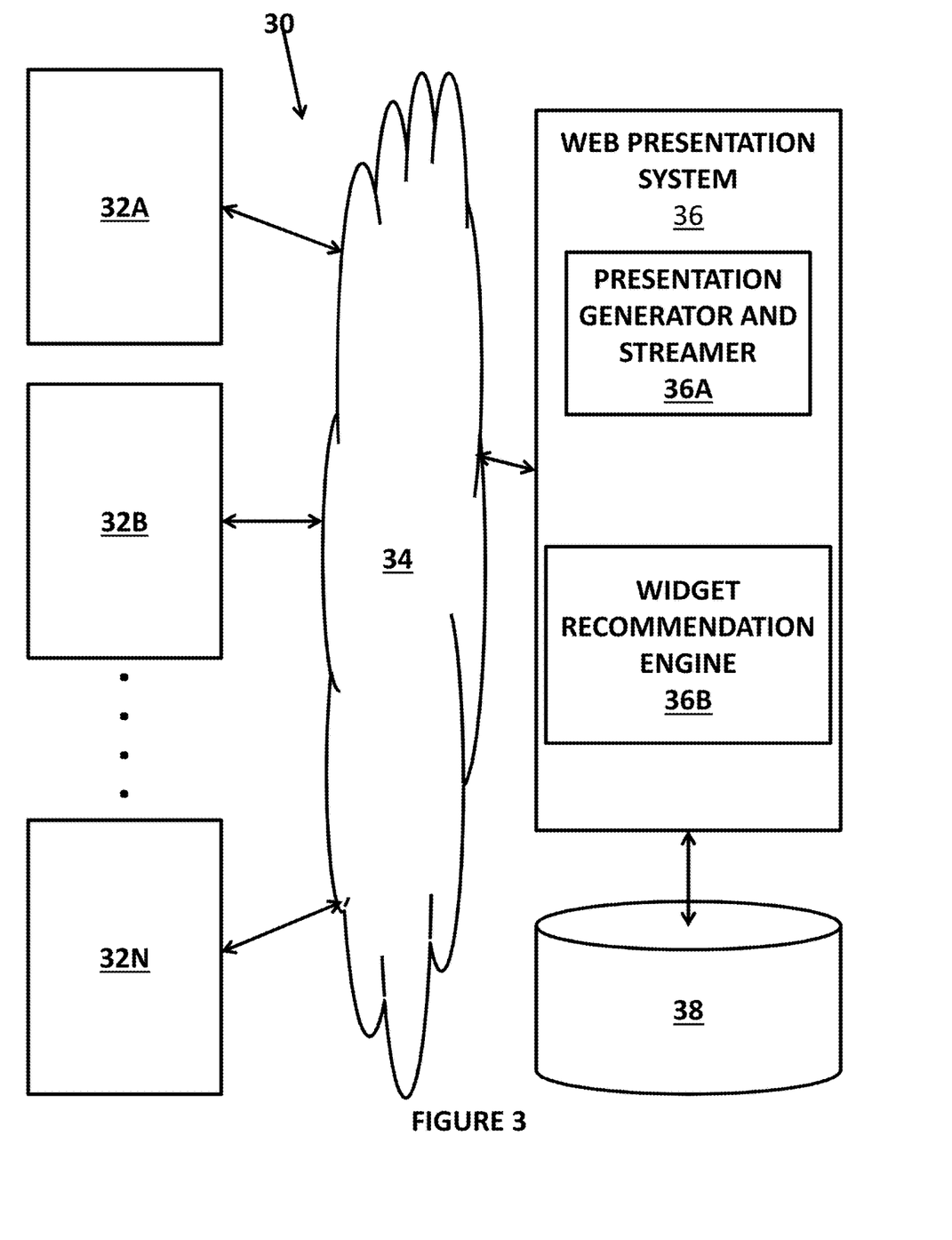
FIG. 3 illustrates an on-line presentation system that may incorporate a widget recommendation system.

FIG. 3 illustrates an on-line presentation system 30 that may incorporate a widget recommendation system 36B that may perform the widget recommendation method. The system 30 may have frontend of the system 32, such as one or more computing devices 32A, 32B, . . . , 32N in the example in FIG. 3, that may connect over a communication path 34 to a backend 36 of a web presentation system. The frontend of the system may be used by various users of the system including a presenter/client of the system that may enter data about an event/presentation and may receive one or more recommended user interface widgets from the system and an attendee who will review the landing page of the particular event/presentation with the recommended one or more user interface widgets. Each computing device of the frontend of the system may allow an entity, such as a user, company, etc., to connect to and interact with the backend 36, such as to register for a presentation, to submit a presentation or control a presentation, to see widget recommendations, to select recommended widgets for a landing page of a presentation/event and/or to review the particular event landing page with the selected widgets. Each computing device 32A, 32B or 32N may be a processor based device with one or more processors, memory, persistent storage, a display, input/output devices such as keyboards or printers, etc. and connectivity circuits that allow the user, using the computing device, to connect to the backend and then interact with the backend 36. For example, each computing device may be a personal computer, a smartphone or mobile device, a terminal device, a laptop computer, a tablet computer, etc. In an embodiment in which HTTPS/HTTP and HTML are used for protocols, each computing device may have a browser application or other application that receives data from the backend and generates a display of that data, such as a webpage and also allows the user to enter data into a form/webpage and send the data to the backend system 36.

The communication path 34 may be a wired path, a wireless path or a combination of the wired and wireless paths. Each piece of the path may be a wired network like Ethernet, a wireless computer network, a wired computer network, a wireless digital data network, a cellular digital data network, a WiFi network and the like. The communication path 34 may use various communication and data transfer protocols. For example, in one embodiment, the communications path may use TCP/IP and HTTP or HTTPS data transfer protocols and the HTML data protocols.

The backend 36 may be implemented using one or more computing resources, such as cloud computing or AMAZON WEB SERVICES® (AWS) resources or server computers. The computing resources used to implement the backend 36 are specifically configured such that, although the computing resources alone are generic computer elements, the combination of the computing resources and the software/hardware described below results in specialized hardware/software that performs the processes of the system as described below.

The backend 36 may include a presentation generator and streamer element 36A and a user interface widget recommendation engine 36B. The presentation generator and streamer element 36A may be used to help a presenter to generate each presentation, store the presentation, allow the user to control the presentation and delivery the presentation to each attendee and gather data about each attendee for each presentation. The widget recommendation engine 36B is used to extract features about widgets and engagements from past events, may generate one or more recommended widgets based on the extracted features and may present the one or more recommended widgets. In some embodiments, the widget recommendation engine 36B may also perform testing of widgets and automatically select one or more widgets for each particular type of event. In the example in FIG. 3, the widget recommendation engine 36B is incorporated into the online, web presentation system 36 as shown. However, the widget recommendation engine 36B may also be a standalone system or a software as a service system that provides its widget recommendations to a plurality of third party presentation systems that can provide the requisite data in order to determine the recommended widgets.

Each of the presentation generator and streamer element 36A and the widget recommendation engine 36B may be implemented in hardware or software or a combination of hardware and software. When each of the presentation generator and streamer element 36A and the widget recommendation engine 36B is implemented in hardware, each of the elements may be a specialized hardware device, such as a field programmable gate array, microcontroller, etc. that may be configured to perform the processes of the presentation generator and streamer element 36A or the widget recommendation engine 36B so that each of these elements is implemented using a specialized piece of hardware. When each of the presentation generator and streamer element 36A and the widget recommendation engine 36B is implemented in software, each of the elements may be a plurality of lines of computer code/instructions that may be executed by a processor of a computing resource of the backend 36 so that the processor is configured to perform the processes of the presentation generator and streamer element 36A or the widget recommendation engine 36B so that each of these elements is implemented using a computing resource with a plurality of lines of computer and it is the plurality of lines of code and the processes implemented that provide the technical solution. When each of the presentation generator and streamer element 36A and the widget recommendation engine 36B is implemented in hardware and software, each element may be a combination of the above described elements that again is a specialized computer system that implements the processes and provides the technical solutions. In the software implementation, the widget recommendation engine 36B may use Python code for the classifier and the database engine for the feature extraction and Java for the services. Furthermore, the system may utilize Java-Based Rest API calls to communicate the backend and frontend as shown in FIG. 4.

Figure 4:
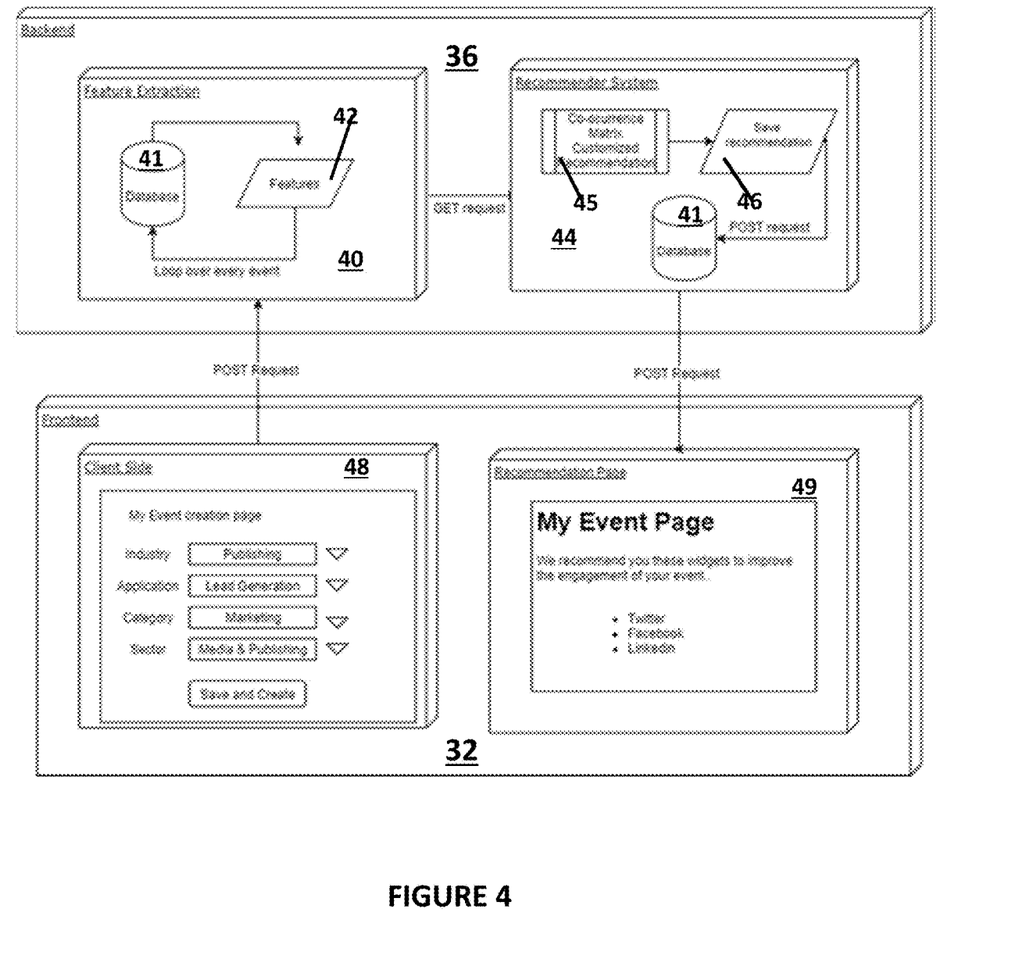
FIG. 4 illustrates more details of the frontend and backend of the widget recommendation system.

FIG. 4 illustrates more details of the frontend 32 and backend 36 of the widget recommendation system 30. The front end 32 may further include a client element 48 and a recommendation element 49 wherein each of these elements may be implemented using the computing devices as described above that allow a user (the soon to be attendee/ registrant for the registrant element and the presenter for a presentation for the client element) to connect to and interact with the backend 36. For example, each of the elements 48, 49 may be a user interface displayed on the computing device that permits the user to interact with the backend 36. For example, the client element 48 may permit a presenter of an event to enter information about the new event, such as the industry, application, category and sector for the event in the example in FIG. 4 and to communicate and save that data about the event to the backend 36. For example, the application information may be partner Training, Investor Relations, Accounting, Medical, Customer Engagement, Sales, Product Launches, Employee Training, Lead Generation, Brand Awareness, Town Hall and/or Sales Training.

In one implementation, a POST request may be used to communicate the new event data to the backend 36. The recommendation element 49 may be a user interface as well that may be displayed to a presenter of a particular presentation/event and may show one or more recommended user interface widgets to add to the landing page of the new event. This user interface may be generated for each presentation/event based on the output of the recommendation engine 36B. In one implementation, the data used to generate the user interface may be delivered from the backend to the recommendation element 49 using a POST request.

The backend 36 may further comprise a feature extraction element 40 and a recommender element 44. These two elements cooperate to perform the widget recommendation process and generating the one or more recommended widgets for each presentation/event. In the embodiment in which the backend automatically selects the recommended widgets for a particular presentation, the recommender element 44 may also perform that programmatic selecting of the one or more widgets for the landing page of the particular event. Each of the feature extraction element 40 and a recommender element 44 may be implemented in software or hardware as described above and may together be a specialized piece of hardware or software that provides the technical solution of the recommended widgets that improve engagement for the event. Furthermore, the one or more user interface widgets and the landing page are unique to the Internet and computers and necessarily use a computer. Furthermore, the various aspects of the technical solution cannot be performed by a human with pen and paper.

The feature extraction element 40 may include a database 41 and a feature extractor 42. The feature extraction element 40 may receive the characteristic data about each event through the POST request and all of that data may be stored in the database 41. The feature extractor 42 may be an algorithm/process that performs feature extraction based on part on the data about each event and the feature extractor 42 may loop over every event to extract the features. The features extracted during this process may be communicated, in one embodiment, using a GET request, to the recommender 44. During the feature extraction, for each event, the features of the industry for the event, the application for the event, the category of the event and the sector for the event may be extracted and each feature may be given a score for the particular event.

The recommender 44 of the backend 36 may further the database 41, a co-occurrence matrix and recommendation process 45 and a save process 46 to save the recommendations into the database 41, such as by using a POST request. The one or more recommendations for each event may then be communicated to the recommendation element 49 of the frontend 32.

Figure 5:
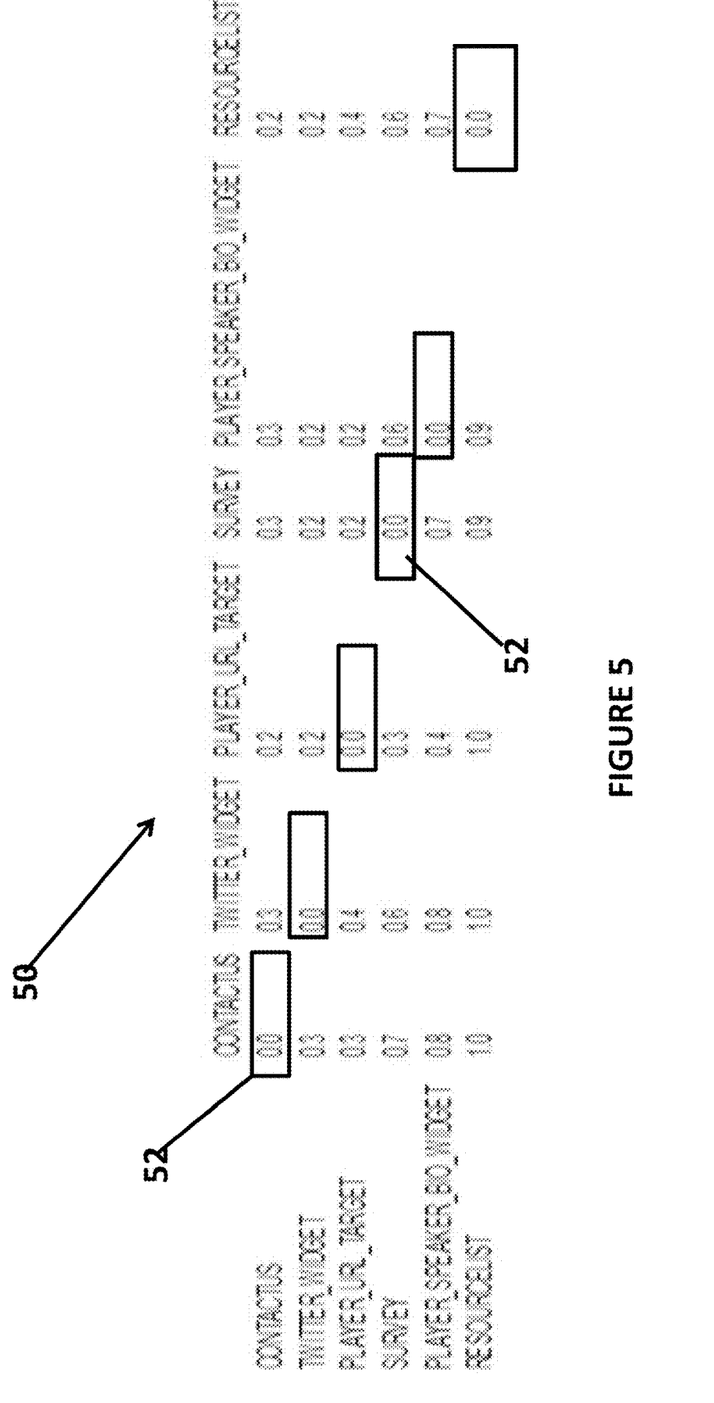
FIG. 5 illustrates an example of a covariance matrix of the widget recommendation system.
Figure 6:
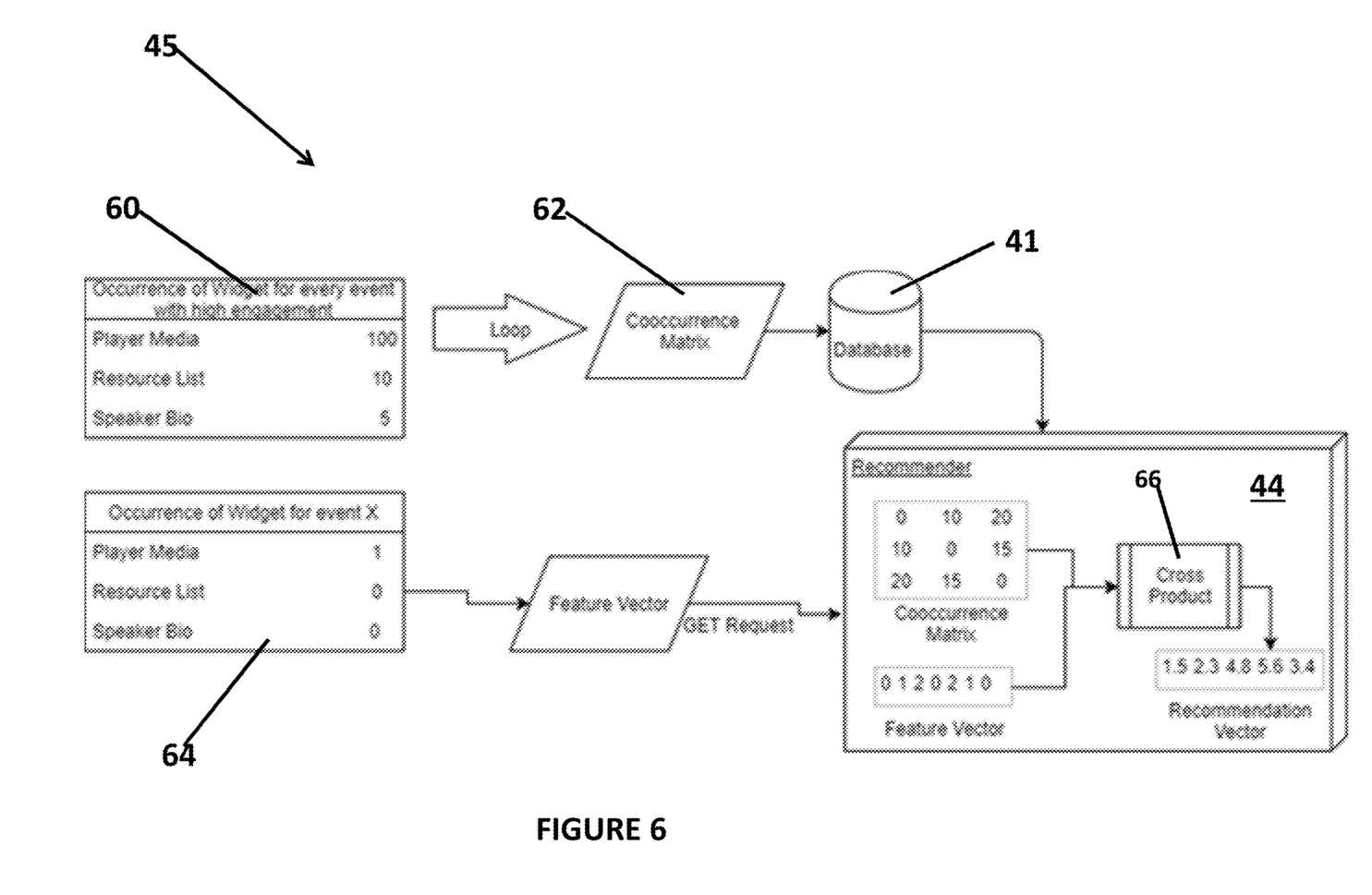
FIG. 6 illustrates more details of the widget recommendation process.

FIG. 5 illustrates an example of a covariance matrix 50 of the widget recommendation system and FIG. 6 illustrates more details of the widget recommendation process 45. As shown in FIG. 6, occurrence data from user interface widgets for all events stored in the database 41 is retrieved 60. The occurrence data may be the occurrence of each widget for every event with high engagement. Thus, for each prior event, the system calculates a median Engagement Score described above of attendees and that is the estimation of the engagement for the event. For example, as shown in FIG. 6, a player media user interface widget occurred in each prior event (100%) that had high engagement, a resource list occurred in 10% of events that has high engagement and a speaker bio widget occurred in 5% of the events that has high engagement. The recommender 44 may loop through the occurrence data and generate a co-occurrence matrix 50.

An example of a co-occurrence matrix is shown in FIG. 5. In most embodiments, the co-occurrence matrix may have 24 columns and 24 rows for all of the widgets that may be recommended. In the example in FIG. 5, a smaller co-occurrence matrix is shown for illustration purposes. The co-occurrence matrix 50 may show the co-occurrence of two different user interface widgets for high engagement events (which is why the value in the matrix for both of the same widgets (like contactus and contactus or survey and survey 52) is 0.0). For example, the co-occurrence of a resource list widget and the survey widget is 0.9 for high engagement events meaning that when the resource widget appears in a high engagement event, the survey widget also was used in the high engagement event.

Returning to FIG. 6, the co-occurrence matrix may be stored in the database 41 and then used by the recommender 44. In addition to the occurrence data for past events, occurrence data for widgets for event X 64 may also be retrieved. In the example in FIG. 6, the occurrence data for event X (64) may be "1" for a player media widget and "0" for a resource list widget and a speaker bio widget. The values in the occurrence data for event X, for each widget, may indicate a number of times that the widget is used in the landing page since a widget can be used more than once in the landing page. The occurrence data from this event may be used to generate a feature vector that is passed onto the recommender 44 via, for example, a GET request.

In one example, a new event (that is a new event for which a recommendation of one or more widgets is requested) may have the following characteristics: 'Biotechnology','Sales Training','Training/Learning'. In this example, the feature vector for these characteristics may be: Resource list: 60, Speaker bio: 42, Survey: 21, Player URL Target: 1, 0 for the other widgets. In this example, the events with the same Industry, Category and application are grouped in a matrix, a row represents the widgets used in every event where every column represents a widget. We summed along the columns (same type of widget). The widgets that occurred in less than 30% of the events in the group are eliminated (the column value set to 0).

As shown in FIG. 6, the feature vector values are converted into a string of values that is fed into the recommender 44. As shown, the recommender 44 may receive inputs of the co-occurrence matrix and the feature vector for the event for which widgets are being recommended. The recommender 44 may perform a cross product process 66 between the co-occurrence matrix and the feature vector for the new event. The cross product is between the feature vector x (1×n) and the co-occurrence matrix A (n×n) where n is the number of widgets and the calculation results in a vector (1×n). The multiplication of the i-th element in the feature vector $x\_i$ (occurrence of i-th widget) by a vector of weights $A\_i$ (the column in the co-occurrence matrix for the i-th widget), is a linear combination that will reveal which widgets occur simultaneously with the i-th widget, the biggest scores reveal which ones occur more frequently.

As shown in FIG. 6, the recommender 44 may generate a recommendation vector that may be used to recommend one or more widgets for the event. In some embodiments, the recommendation vector may be used to automatically select the one or more widgets that may be added to the landing page of the particular event.

Continuing the example above for the event that has the following characteristics: 'Biotechnology','Sales Training', 'Training/Learning', a recommending process, get_recommendation('Biotechnology','Sales Training','Training/Learning'), results in the following exemplary output:

| Widget | Score |
|---|---|
| Survey | 1.231428 |
| Resource list | 0.891438 |
| Speaker Bio | 0.651335 |
| Player URL target | 0.622844 |
| Contact us | 0.494762 |
| Twitter | 0.439685 |

Using the above scores or the recommendation vector shown in FIG. 6, the system may thus generate the recommendation element 49 (shown in FIG. 4) to the presenter of the particular event with the recommended widgets that occur in high engagement events and the presenter can choose to add any of the recommended widgets or the system may automatically select and add the recommended widgets.

In the embodiment in which the recommendations are used to automatically select the widgets for the landing page, depending on the account settings, the system may automatically pick the optimal widget configuration based on use case, or present a prompt to the user, letting them know that their current configuration does not contain the best mix of widgets for optimal audience engagement, allowing them to opt-in and add those widgets to their Audience Console.

FIG. 7 illustrates an example of a landing page 70 with a presentation and content and one or more recommended widgets. As shown, the landing page 70 may have a presentation portion 72 and a slides portion 74 and one or more user interface widgets 76. The presentation portion 72 may be a media player that displays the event to each member of the audience. The slides portion 74 may be a user interface element capable of displaying the slides, if any, that accompany the presentation. In the example in FIG. 7, the one or more user interface widgets may include a Media Player widget, a Q&A Widget, a Slides Widget, a Player online Help widget, a Chat Widget and a speaker Bio Widget.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that performs particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method, comprising:

receiving a set of characteristics for a particular event;

generating, using the set of characteristics, a feature vector associated with the particular event, the feature vector including occurrence data for a player media widget in the particular event, occurrence data for a resource list widget in the particular event and occurrence data for a speaker bio widget in the particular event, wherein an occurrence is a use of a user interface widget on a particular event page by a user and occurrence data is a number of times the user interface widget is used on the particular event page by each user attending the particular event;

retrieving data about a plurality of prior events, the data for each prior event including an engagement score in the range from 0 to 10 for the prior event and one or more user interface widgets included in an event page of the prior event;

generating, using the data about the prior events, a co-occurrence matrix that is an array of values wherein each value corresponds to the occurrence of both a first user interface widget and a second user interface widget on event pages for high engagement prior events that have engagement scores of greater than five;

comparing the feature vector of the particular event and the co-occurrence matrix to generate one or more recommended user interface widgets for the particular event to be included in one of a webinar and the particular event page of the particular event;

displaying, to a presenter of the particular event, the one or more recommended user interface widgets for the particular event;

automatically selecting the one or more recommended user interface widgets; and inserting the selected one or more recommended user interface widgets onto the particular event page for the particular event.

2. The method of claim 1, wherein comparing the feature vector of the particular event and the co-occurrence matrix further comprises performing a cross product operation with the feature vector of the particular event and the co-occurrence matrix.

3. The method of claim 1, wherein the set of characteristics includes one or more of an industry related to the particular event, an application related to the particular event, a category related to the particular event and a sector related to the particular event.

4. The method of claim 1, wherein each user interface widget further comprises a user interface element on the particular event page that performs a particular function when a user clicks on the user interface element.

5. The method of claim 4, wherein the particular event page is a landing page that has an event media player and the one or more recommended user interface widgets.

6. The method of claim 5, wherein the particular event is one of a webinar, an interactive video and a flipbook.

7. The method of claim 5 further comprising presenting the particular event and the landing page to a user.

8. The method of claim 1, wherein the engagement score measures participation of an attendee, interactivity with the one or more user interface widgets and use of event features by the attendee.

9. A system, comprising:
a computing device having a processor, a memory and a display;
a backend computer system capable of being connected to each computing device, the backend having a processor, memory and a plurality of lines of instructions configured to:
receive a set of characteristics for a particular event;
generate, using the set of characteristics, a feature vector associated with the particular event, the feature vector including occurrence data for a player media widget in the particular event, occurrence data for a resource list widget in the particular event and occurrence data for a speaker bio widget in the particular event, wherein an occurrence is a use of a user interface widget on a particular event page by a user and occurrence data is a number of times the user interface widget is used on the particular event page by each user attending the particular event;
retrieve data about a plurality of prior events, the data for each prior event including an engagement score in the range from 0 to 10 for the prior event and one or more user interface widgets included in an event page of the prior event;
generate, using the data about the prior events, a co-occurrence matrix that is an array of values wherein each value corresponds to the occurrence of both a first user interface widget and a second user interface widget on event pages for high engagement prior events that have engagement scores of greater than five;
compare the feature vector of the particular event and a co-occurrence matrix to generate one or more recommended user interface widgets for the particular event to be included in one of a webinar and the particular event page of the particular event; and
communicate the one or more recommended user interface widgets for the particular event to the computing device; and the display of the computing device is configured to display the one or more recommended user interface widgets for the particular event page of the particular event.

10. The system of claim 9, wherein the backend computer system is further configured to perform a cross product operation with the feature vector of the particular event and the co-occurrence matrix to generate one or more recommended user interface widgets for the particular event to be included in the particular event page of the particular event.

11. The system of claim 9, wherein the backend computer system is further configured to automatically select the one or more recommended user interface widgets and insert the selected one or more recommended user interface widgets onto the particular event page for the particular event.

12. The system of claim 9, wherein the set of characteristics includes one or more of an industry related to the particular event, an application related to the particular event, a category related to the particular event and a sector related to the particular event.

13. The system of claim 9, wherein each user interface widget further comprises a user interface element on the particular event page that performs a particular function when a user clicks on the user interface element.

14. The system of claim 13, wherein the particular event page is a landing page that has an event media player and the one or more recommended user interface widgets.

15. The system of claim 14, wherein the particular event is one of a webinar, an interactive video and a flipbook.

16. The system of claim 14 further comprising a second computing device having a second processor, a second memory and a second display that displays the landing page for an audience member.

17. The system of claim 9, wherein the engagement score measures participation of an attendee, interactivity with the one or more user interface widgets and use of event features by the attendee.

18. An apparatus, comprising:
a backend computer system having a processor, memory and a plurality of lines of instructions configured to:
receive a set of characteristics for a particular event;
generate, using the set of characteristics, a feature vector associated with the particular event, the feature vector including occurrence data for a player media widget in the particular event, occurrence data for a resource list widget in the particular event and occurrence data for a speaker bio widget in the particular event, wherein an occurrence is a use of a user interface widget on a particular event page by a user and occurrence data is a number of times the user interface widget is used on the particular event page by each user attending the particular event;
retrieve data about a plurality of prior events, the data for each prior event including an engagement score in the range from 0 to 10 for the prior event and one or more user interface widgets included in an event page of the prior event;
generate, using the data about the prior events, a co-occurrence matrix that is an array of values wherein each value corresponds to the occurrence of both a first user interface widget and a second user interface widget on event pages for high engagement prior events that have engagement scores of greater than five;
compare the feature vector of the particular event and a co-occurrence matrix to generate one or more recommended user interface widgets for the particular event to be included in the particular event page of the particular event; and generate a user interface that displays the one or more recommended user interface widgets on the particular event page of the particular event.

19. The apparatus of claim 18, wherein the backend computer system is further configured to perform a cross product operation with the feature vector of the particular event and the co-occurrence matrix to generate one or more recommended user interface widgets for the event to be included in the particular event page of the particular event.

20. The apparatus of claim 18, wherein the backend computer system is further configured to automatically select the one or more recommended user interface widgets and insert the selected one or more recommended user interface widgets onto the particular event page for the particular event.

21. The apparatus of claim 18, wherein the set of characteristics includes one or more of an industry related to the particular event, an application related to the particular event, a category related to the particular event and a sector related to the particular event.

22. The apparatus of claim 18, wherein each user interface widget further comprises a user interface element on the particular event page that performs a particular function when a user clicks on the user interface element.

23. The apparatus of claim 22, wherein the particular event page is a landing page that has an event media player and the one or more recommended user interface widgets.

24. The apparatus of claim 23, wherein the particular event is one of a webinar, an interactive video and a flipbook.

25. The apparatus of claim 18, wherein the engagement score measures participation of an attendee, interactivity with one or more user interface widgets and use of event features by the attendee.

\* \* \* \* \*